May 22, 1928.

G. A. MERKT 1,670,471

LUBRICANT DISTRIBUTOR

Filed Jan. 19, 1927    2 Sheets-Sheet 1

Inventor:
Gustav A. Merkt
By Geo. H. Kennedy
Attorney

May 22, 1928.  
G. A. MERKT  
LUBRICANT DISTRIBUTOR  
Filed Jan. 19, 1927  
1,670,471  
2 Sheets-Sheet 2

Inventor  
G. A. Merkt  
By Geo. H. Kennedy Jr.  
Attorney

Patented May 22, 1928.

1,670,471

UNITED STATES PATENT OFFICE.

GUSTAV A. MERKT, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

LUBRICANT DISTRIBUTOR.

Application filed January 19, 1927. Serial No. 162,127.

The invention relates to the lubrication of rotating members in rolling contact, as for instance, a pair of intermeshing gears. An expedient for securing lubrication of such parts is to allow the bottom gear to revolve in a bath of oil. By this expedient, some oil may be carried by the teeth of the lower gear until contact is made with the other gears, but the greater part of the oil is thrown off by centrifugal force, either in the form of a visible splash or as a mist, and so falls back into the oil bath, or is lost entirely through dissipation. Another expedient has been the use of a drip oiler, either singly, or with some means, such as a plate or deflector, for conducting the lubricant to the rising side of the lower gear. This method, however, is open to the objection that the lubricant is apt to be localized on the gears rather than spread across the entire width of the gear faces, as should be the case.

The present invention provides an oil reservoir or catch basin, which may act as a deflector to catch the aforesaid splash or mist thrown off by the gears, or which may be fed from an oil feeder, or both; at all events the reservoir is provided with means to distribute the oil evenly over the whole width of the gear face, rather than on a portion thereof. Consequently, when my invention is used, there is no uneven wearing of the gears which is so detrimental to smooth running. As will be seen, my apparatus is simple, and requires no care, once it is installed.

In the drawings.

Like reference characters refer to like parts in the different figures.

Figure 1:
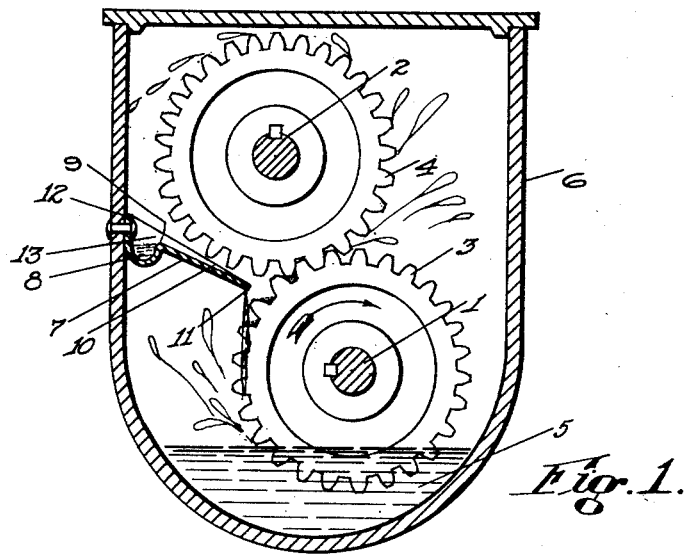
Fig. 1 is a sectional view of a distributor embodying the invention.

Referring first to Fig. 1, the numerals 1 and 2 represent a pair of shafts to which are fastened, as by keys, a pair of gears 3 and 4. These gears may be of any type, for example, spur, helical or herringbone, and the teeth may be of any shape or contour. An oil bath 5 of any desired type is provided, in which a portion of the bottom gear 3 is submerged, and a casing or housing 6 incloses or partially incloses both gears.

The distributor of the invention is indicated generally by the numeral 7; it provides a pocket or catch basin 8, the front edge 9 of which is truly horizontal. In this manner, oil which has accumulated in the basin 8 and which overflows the edge 9 will be spread out as a sheet of uniform thickness on the conducting surface 10 which leads the oil to the meshing side of gear 3 close to the line of contact between it and gear 4. The surface 10 provides a front delivery edge 11 which is also horizontal, and thus the sheet of oil is delivered to the lower gear with an even distribution along the faces of the teeth.

The particular embodiment of the invention shown in Fig. 1 is supplied with oil by its interception of the oil mist and splash. As shown, the distributor 7 is fastened to the casing 6 at 12, and is to all intents and purposes, integral with it; thus all the oil falling down this particular wall of the casing will find its way to the pocket 8, and under many conditions of operation, this has been found to be a sufficient supply to properly lubricate a pair of gears. By accumulating the oil in a basin, and then allowing it to spread evenly over a surface, an even lateral distribution is assured, no matter how intermittent the supply, and regardless of the fact that it may flow very unevenly down the side of the casing, from one cause or another. The deflector is completed by side plates 13, 13, in order to close the sides of the pocket 8 and make it a catch basin, but of course this is a matter of detail, and the deflector may be made in a single piece, if desired.

Figure 4:
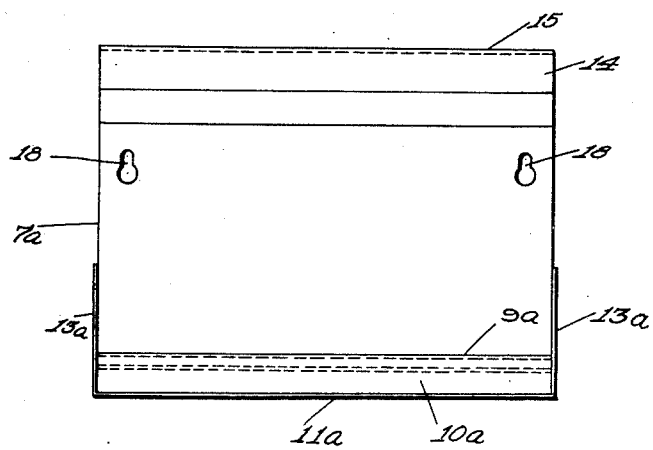
Fig. 4 is an elevation of the oil deflector of Figs. 2 and 3.
Figure 2:
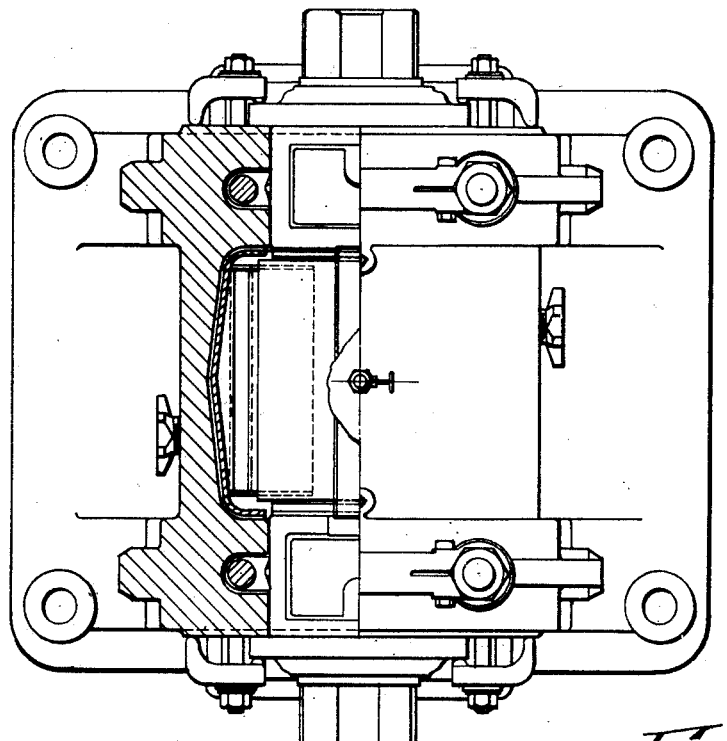
Figs. 2 and 3 are, respectively, a plan view and an elevation of a pinion housing for a plurality of gears as used in a rolling mill, showing an oil deflector according to my invention specially designed therefor, the oil being fed to the distributor by a dripping oil feeder; in each of these views, parts are broken away to show the construction in section.
Figure 3:
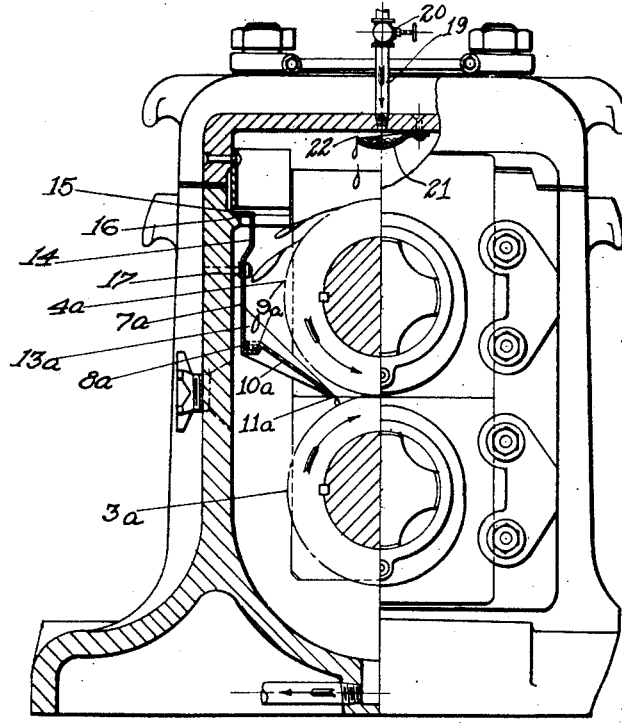

Referring now to Figs. 2, 3 and 4, the invention is shown applied, by way of specific example, to a pinion housing for rolling mills. The pinions 3ª and 4ª in such a housing are generally of the herringbone type and, as they carry great loads, are comparatively broad. Owing to the progressive meshing action on the surface of each tooth, it is quite essential, in such gearing, that uneven wear be avoided, since otherwise harmful vibration will be set up in the housing. There is no need to describe the housing in detail, as it forms no part of the present invention, a description of such a housing appearing in United States Letters Patent to George, No. 1,221,043, of April 3, 1917.

The distributor 7ª may be made of sheet metal to which side plates 13ª—13ª are welded. The pocket 8ª, edges 9ª and 11ª, and delivery portion 10ª are substantially the same as in the case of the distributor 7. But to make it more readily collect oil in this particular housing, the distributor 7ª is provided with an upwardly extending portion 14 with a bent over end 15, which rests on a shoulder 16 of the housing. Headed studs 17—17 driven in the housing hold this distributor by cooperation with key slots 18—18 in the said distributor, whereby it may be readily removed for straightening purposes, or to level off the edges 9ª and 11ª in case they are not truly horizontal.

To feed oil to the distributor 7ª, a feed pipe 19 is provided, and this feed pipe may have a valve 20 to regulate the quantity of oil delivered to the gears. Instead of delivering the oil direct to the distributor 7ª, it is allowed to reach said distributor by way of the upper gear 4ª in the way of a splash from said gear. Of course, any oil that happens, by adhesive force, to cling to the said gear 4ª, resisting the centrifugal force, simply accomplishes the lubrication of said gear directly. In order that this direct lubrication may be uniform over the surface of the gear 4ª, a basin 21 is provided, fastened to the housing just below the feed pipe 19; this catch basin has a horizontal front edge 22 and in itself represents a particular embodiment of my invention.

The gears 3ª and 4ª are thus lubricated evenly, and will last longer and run more smoothly, this result not having been attained with previous apparatus unprovided with reservoirs or catch basins, since lubricating oil has practically no tendency to spread and hence, if initially concentrated, in a given line of flow, will remain substantially in that line.

I claim:

1. The combination with a pair of intermeshing gears and means for supplying lubricating oil, of a catch basin to receive said oil, an even horizontal front edge to said catch basin, and a distributing plane surface below said front edge to conduct the overflowing oil evenly in sheet form by gravity to one of said gears.

2. The combination with a pair of intermeshing gears and means for supplying lubricating oil, of a catch basin to receive said oil, an even horizontal front edge to said catch basin, a distributing plane surface below said front edge to conduct the overflowing oil evenly by gravity to one of said gears, and an even horizontal front edge to said plane surface, to deliver the oil to the said gear in an even sheet.

3. The combination with a pair of intermeshing gears having broad teeth faces relative to their diameters, and a housing enclosing said gears, of means for supplying lubricating oil, a reservoir or catch basin to collect said oil, a level horizontal edge to said catch basin, a depending smooth surface extending below said front edge, and a horizontal straight lower edge to said depending surface whereby to deliver oil evenly in sheet form to one of said gears, to prevent uneven wear across the teeth thereof.

4. The combination with a pair of intermeshing gears having broad teeth faces in relation to their diameters and a housing enclosing said gears, of oil supply means, a distributing member below said oil supply means having a horizontal front edge, whereby to deliver oil in sheet form to the upper of said gears, a member as wide as said gears having a broad surface adapted to intercept the flying spray from said top gear, a shallow reservoir or catch basin provided by said member, a horizontal straight front edge to said catch basin, a depending smooth surface from said catch basin, and a horizontal straight lower edge to said surface, said edge being adjacent the zone of contact of said gears and located at the leading side thereof, whereby to distribute oil across the broad face of said upper gear in sheet form and, collecting the spray discharged from said gear, to redistribute it in sheet form to said lower gear adjacent to the line of mesh of said gears.

Dated this thirteenth day of January, 1927.

GUSTAV A. MERKT.